United States Patent
Elsinger et al.

(10) Patent No.: US 9,518,526 B2
(45) Date of Patent: Dec. 13, 2016

(54) METHOD FOR CONTROLLING AN INJECTOR

(71) Applicant: Robert Bosch GmbH, Stuttgart (DE)

(72) Inventors: Andrej Elsinger, Ditzingen (DE); Ulrich Doebler, Vaihingen/Enz (DE); Cornelia Giessler, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 14/201,023

(22) Filed: Mar. 7, 2014

(65) Prior Publication Data
US 2014/0251260 A1 Sep. 11, 2014

(30) Foreign Application Priority Data
Mar. 11, 2013 (DE) .................. 10 2013 204 103

(51) Int. Cl.
*F02D 41/20* (2006.01)
*F02D 41/30* (2006.01)
*F02D 41/40* (2006.01)
*F02D 41/04* (2006.01)
*F02D 41/06* (2006.01)
*F02M 51/06* (2006.01)
*F02D 41/14* (2006.01)
(Continued)

(52) U.S. Cl.
CPC .......... *F02D 41/3005* (2013.01); *F02D 41/20* (2013.01); *F02D 41/2096* (2013.01); *F02D 41/30* (2013.01); *F02D 41/40* (2013.01); *F02D 41/042* (2013.01); *F02D 41/062* (2013.01); *F02D 41/2464* (2013.01); *F02D 2041/1433* (2013.01); *F02D 2041/2055* (2013.01); *F02D 2041/2058* (2013.01); *F02M 51/0603* (2013.01); *F02M 61/08* (2013.01)

(58) Field of Classification Search
CPC ...... F02D 41/3005; F02D 41/20; F02D 41/30; F02D 41/40; F02D 2041/2055; F02D 2041/2058
USPC ............... 123/294, 472, 478, 494, 498, 490; 239/102.2, 584
See application file for complete search history.

(56) References Cited

U.S. PATENT DOCUMENTS 5,325,837 A * 7/1994 Laufer .................. F02D 41/403
123/449
5,810,255 A * 9/1998 Itoh .................... F02M 51/0603
239/102.2
(Continued)

FOREIGN PATENT DOCUMENTS

DE    10 2011 006 202    10/2012

*Primary Examiner* — Mahmoud Gimie
(74) *Attorney, Agent, or Firm* — Norton Rose Fulbright US LLP; Gerard Messina

(57) ABSTRACT

In a method for controlling a valve which injects fuel into a combustion chamber of an engine and which has a valve member which closes a valve opening, and an electric actuator which drives the valve member to carry out strokes for releasing the valve opening and to which electrical control signals are applied for triggering valve member strokes of a defined stroke size, in order to compensate for an age-related stroke reduction of the valve member and deteriorated metering of the injected fuel related thereto, a stroke loss model into which temperature and temperature changes at the valve as well as the number of strokes carried out by the valve member are continuously incorporated is used to predict a reduction of the stroke size as a stroke loss and to correct the control signals using the predicted stroke loss.

13 Claims, 3 Drawing Sheets

(51) Int. Cl.
 *F02D 41/24* (2006.01)
 *F02M 61/08* (2006.01)

(56) References Cited

U.S. PATENT DOCUMENTS

| | | | |
|---|---|---|---|
| 6,681,999 B1* | 1/2004 | Ruehle | F02M 51/0603 239/533.2 |
| 6,705,544 B1* | 3/2004 | Rueger | F02D 41/2096 239/102.2 |
| 2011/0180044 A1* | 7/2011 | Fritsch | F02D 41/2096 123/478 |

* cited by examiner

Fig. 3

| stroke number/engine start up | RF |
|---|---|
| ≤ 40.000 | 1,0 |
| ≤ 120.000 | 0,8 |
| > 200.000 | 0,7 |

Fig. 4

| TW | AF |
|---|---|
| 1 - 1.000 | 1,0 |
| 1.001 - 10.000 | 0,8 |
| 10.001 - 20.000 | 0,7 |
| 20.001 - 50.000 | 0,6 |
| 50.001 - 75.000 | 0,55 |

METHOD FOR CONTROLLING AN INJECTOR

BACKGROUND OF THE INVENTION

1. Field of the Invention

The present invention is directed to a method for controlling a valve which injects fuel into a combustion chamber of an internal combustion engine.

2. Description of the Related Art

A known valve for injecting fuel into the combustion chamber of an internal combustion engine (DE 10 2011 006 202 A1) has a valve housing which is provided with a fuel inlet and a valve opening which is connected to the fuel inlet. The valve opening is implemented in a hollow valve-seat carrier, which closes the valve housing on the combustion chamber side, and is enclosed by a valve seat. A valve member which is displaceable axially in the valve-seat carrier closes the valve opening under the effect of a valve-closure spring acting on it. For the purpose of a defined release of the valve opening, a piezoelectric actuator drives the valve member to carry out strokes against the restoring force of the valve-closure spring. For metering the fuel quantity injected with each stroke into the combustion chamber through the valve opening, the valve is controlled in such a way that electrical control signals, which determine the stroke size of the strokes of the valve member, are applied to the actuator. The control signals may be a time-limited voltage or a charge. The control signals are usually generated in an engine control unit as a function of the instantaneous operating data of the internal combustion engine.

As a consequence of wear at the valve seat and the valve-closure member, as well as of changes in the stroke of the actuator during the service life of the valve, the stroke of the valve member and thus the metering of the fuel injected into the combustion chamber are reduced if the control signal remains unchanged.

BRIEF SUMMARY OF THE INVENTION

The method according to the present invention for controlling the fuel injector has the advantage that with the aid of the stroke loss model, a stroke change of the valve member resulting from aging and wear effects is estimated and compensated for by correcting the control signals. The corrected signal then effectuates a stroke of the valve member which is the same as in a new valve and which is required for an optimal combustion of the fuel in the combustion chamber due to the instantaneous operating data of the internal combustion engine. Aging and wear of the valve therefore do not have an effect on the metering accuracy of the valve and on the quality of the fuel combustion.

BRIEF DESCRIPTION OF THE DRAWINGS

FIG. 3 shows an example of a classification stored in the stroke loss model for obtaining a regeneration factor.

FIG. 4 shows an example of a classification stored in the stroke loss model for obtaining an aging factor.

DETAILED DESCRIPTION OF THE INVENTION

Figure 1:
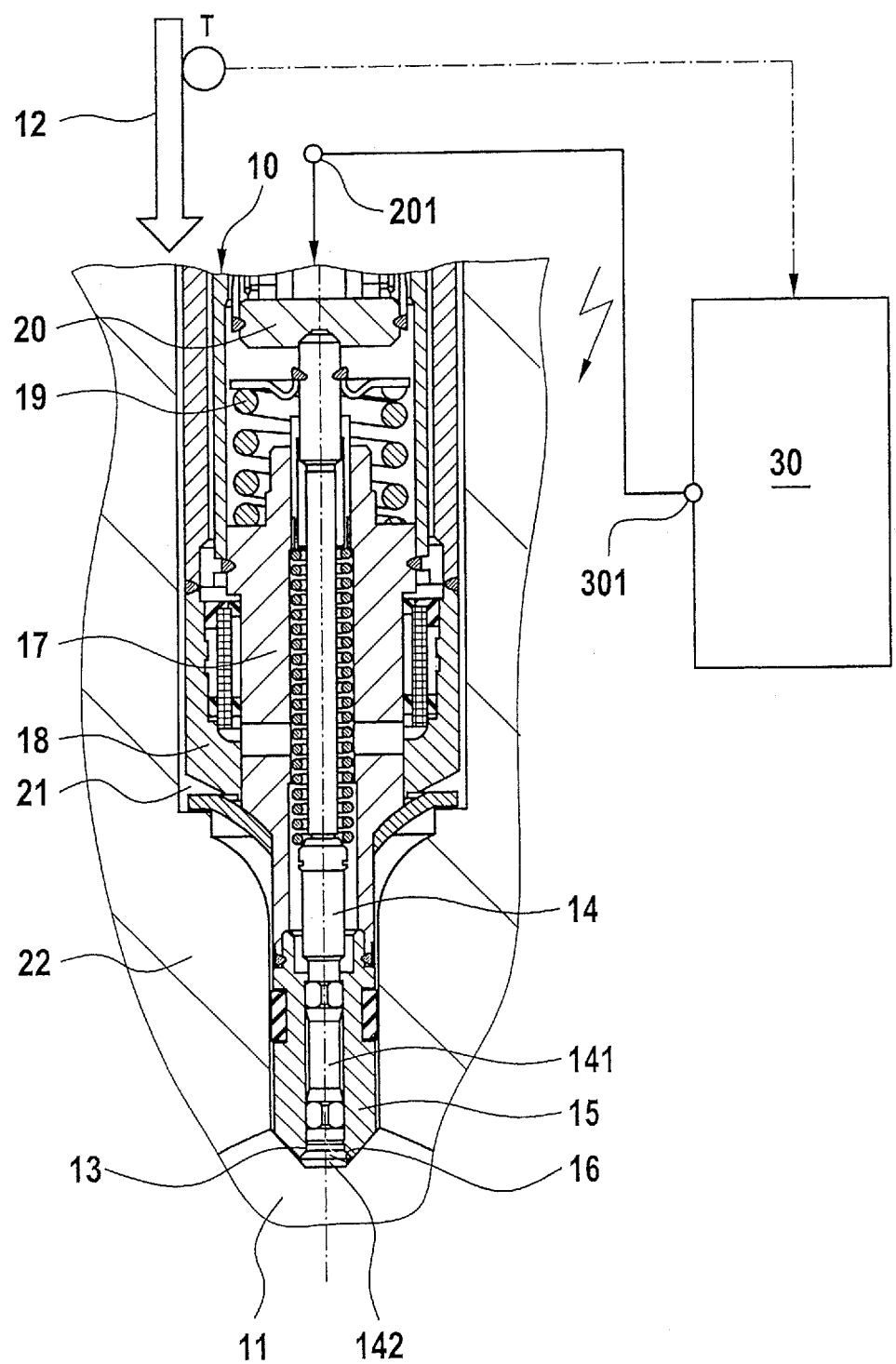
FIG. 1 shows a longitudinal section of a valve for injecting fuel into the combustion chamber of an internal combustion engine in conjunction with an engine control unit for controlling the valve.

Valve 10, which is illustrated in FIG. 1 in a longitudinal section, for injecting fuel into combustion chamber 11 of an internal combustion engine has a valve opening 13 which is connected to a fuel inlet 12, a valve member 14 which closes valve opening 13, and an electric actuator 20 which drives valve member 14 to carry out strokes for the purpose of releasing valve opening 13 and which is designed as a piezoelectric actuator in the illustrated exemplary embodiment. In FIG. 1, fuel inlet 12 is symbolized by an arrow. Valve opening 13 is introduced into a hollow valve-seat carrier 15 and is enclosed by a valve seat 16 which is integrally connected to valve-seat carrier 15. Valve-seat carrier 15 is fixedly connected to a valve body 17 which is inserted into the front end of a tubular valve housing 18. Valve member 14 which includes a shaft 141 and a closing head 142 is axially displaceably guided with its shaft 141 in valve-seat carrier 15. Actuator 20 and a valve-closure spring 19 both act on the end of shaft 141 facing away from closing head 142. The tensile force of valve-closure spring 19 presses closing head 142 onto valve seat 16, and closing head 142 lifts to a greater or lesser extent outward and away from valve seat 16 due to a pressure applied to shaft 141 by actuator 20, so that a metered fuel quantity 20 is injected through valve opening 13 which becomes free. Valve 10 is usually inserted into a cylinder head bore 21 of a cylinder head 22 which covers combustion chamber 11 in such a way that it protrudes into combustion chamber 11 together with the end of valve-seat carrier 15 bearing valve opening 13 and valve seat 16.

In order to trigger the strokes of valve member 14, which take place against the tensile force of valve-closure spring 19, at a stroke size or stroke height, defined in each case, which causes a required fuel quantity to be injected into combustion chamber 11 of the internal combustion engine, actuator 20 is acted on by electrical control signals, e.g., by a time-limited voltage or charge. The control signals are generated in an engine control unit 30 as a function of instantaneous operating data of the internal combustion engine and supplied to control input 201 of actuator 20.

It has been demonstrated that as valve 10 ages, wear and tear occur on valve seat 15 and/or on the closing head of valve member 14, which results in a reduction of the stroke of valve member 14 if the control signal remains unchanged. However, age-related changes in the actuator stroke also contribute to such stroke reductions. A stroke reduction of valve member 14 results in inaccurate metering of the injected fuel quantity and in a reduction of the quality of the fuel combustion in combustion chamber 11.

To counteract this phenomenon, the control signals which are supplied to control input 201 of actuator 20 according to the method according to the present invention for controlling valve 10 are corrected with the aid of a stroke loss model implemented in engine control unit 30 in such a way that the age-related stroke reduction of valve member 14, the so-called stroke loss, is compensated for and thus the necessary stroke size, the so-called nominal stroke, which is predefined based on the operating data in engine control unit 30, is in fact achieved during the stoke of valve member 14. For this purpose, temperature and temperature changes, also referred to as temperature fluctuations or temperature lifts, at valve 10 as well as the number of strokes carried out by valve member 14, this number corresponding to the number of fuel injections into combustion chamber 11 of the internal combustion engine, are continuously incorporated into the stroke loss model and a stroke loss HV to be expected is predicted using these data. Predicted stroke loss HV is added to nominal stroke $H_{nenn}$, which is ascertained based on the operating data of the internal combustion engine, and effective stroke H* thus estimated is transformed into an electrical control signal which reaches control input 201 of actuator 20.

The temperature and the temperature changes are measured in valve 10, e.g., in the fuel inlet to valve 10, but they may also be predicted using a temperature model of valve 10. The detection of the temperature changes preferably takes place separately for the active and the passive phases of the internal combustion engine, the active phase being initiated when the engine starts up and the passive phase being initiated when the engine stops. The different parameters of the stroke loss model are ascertained empirically at valve 10 which is separated from the internal combustion engine. A temperature-related stroke loss HV(TW) which is influenced by the temperature changes and an operation-time related stroke loss HV(BZ) which takes into consideration the operation time of the valve are applied in the stroke loss model. Temperature-related stroke loss HV(TW) is taken into consideration separately as an active temperature change aTW for the active phase of the internal combustion engine (engine is running) and as a passive temperature change pTW for the passive phase of the internal combustion engine (engine is not running). Active temperature change aTW is in this case determined by temperature $T_s$ in valve 10 during engine stop, and passive temperature change pTW is determined by maximum temperature $T_{max}$ in valve 10 within a predefined time period, so-called post-heating time τ, after the engine stops.

Mathematically, the stroke loss during the active phases of the internal combustion engine may be described by $$HV(aTW) = n \cdot aTW \cdot \frac{HW}{aTW} \quad (1)$$

and the stroke loss during the passive phases of the internal combustion engine may be described by $$HV(pTW) = n \cdot pTW \cdot \frac{HV}{pTW} \quad (2)$$

n being the number of active or passive temperature changes. Stroke loss HV per active temperature change aTW and stroke loss HV per passive temperature change pTW are ascertained empirically.

In addition to temperature-related stroke loss HV(TW), an operation-related stroke loss HV(BZ) is also detected which is to be described mathematically by $$HV(BZ) = BZ \cdot \frac{HV}{BZ} \quad (3)$$

Operation time BZ is preferably indicated as mileage, and stroke loss HV per predefined value of operation time BZ is determined empirically, the predefined value being established arbitrarily for BZ, e.g., at 1000 km.

The active and passive temperature changes may each be classified, i.e., assigned to classes having different temperature ranges, for the sake of improving the stroke loss model. For each class, a specific stroke loss HV per active temperature change aTW or per passive temperature change pTW is empirically ascertained and assigned to the class. For example, three classes are provided including TW<=100° C., TW<=120° C., and TW>120° C., in particular for both active temperature change aTW and passive temperature change pTW. Temperature changes aTW and pTW are counted per class and multiplied in the individual classes by stroke loss HV per aTW and pTW, which is empirically determined for each class, according to equation (1) and equation (2). The sum of all stroke losses yields the temperature-related stroke loss according to $$HV(TW) = HV(aTW, class1) + HV(aTW, class2) + \quad (4)$$
$$HV(aTW, class3) + HV(pTW, class1) +$$
$$HV(pTW, class2) + HV(pTW, class3)$$

The active phase of the internal combustion engine has a regenerative effect on the stroke loss of valve member 14. In order to also take this regenerative effect into consideration in the stroke loss model, classes in the stroke loss model have predefined areas for the number of strokes of valve member 14 in an active phase of the internal combustion engine and regeneration factors RF assigned to the classes. A regeneration factor RF is empirically determined for each class. One example of the categorization of the stroke numbers carried out by valve member 14 per engine start up, i.e., per active phase of the internal combustion engine, is indicated in FIG. 3. Based on the number of strokes of valve member 14 which is detected during each active phase of the internal combustion engine and which is identical to the number of fuel injections ES during the active phase of the internal combustion engine, assigned regeneration factor RF is read out from the appropriate class.

In addition to temperature-related stroke loss HV(TW) mentioned above, which is linear, the temperature changes also have a non-linear influence on the stroke loss. In order to detect this non-linear influence as well, the total number of the temperature changes in valve 10 is also taken into consideration in the stroke loss model. For this purpose, a classification of the number of temperature changes is included in the stroke loss model and each class having a predefined number range of temperature changes is assigned an empirically determined aging factor AF. One example of such a classification of the number of temperature changes TW is illustrated in FIG. 4 with the aid of the operation time of valve 10 and assigned aging factors AF. All temperature changes TW are counted and aging factor AF is retrieved from the relevant class according to the total number of accrued temperature changes TW over all active and passive phases of the internal combustion engine.

Overall, the stroke loss model is mathematically described by $$HV = AF \cdot RF \cdot (HV(TW) + HV(BZ)) \quad (5),$$

where AF and RF are retrieved from the tables according to FIGS. 3 and 4, and HV(TW) is determined according to equation (1), equation (2) and equation (4), and HV(BZ) is determined according to equation (3).

Figure 2:
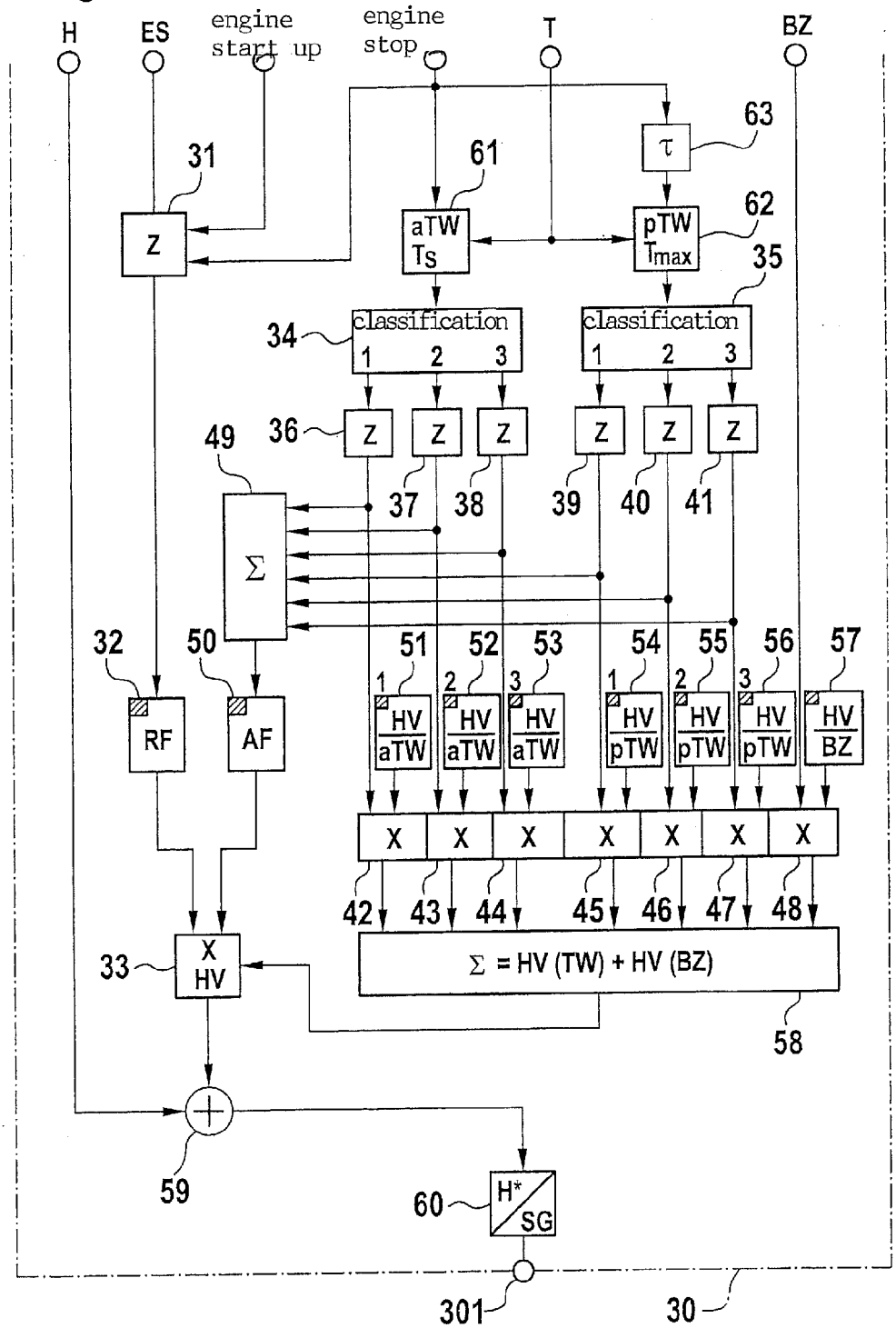
FIG. 2 shows a block diagram of the engine control unit having an integrated stroke loss model.

In FIG. 2, a block diagram of the stroke loss model which is included in engine control unit 30 is depicted for illustration purposes of the control method according to the present invention for fuel-injecting valve 10. Engine control unit 30 usually triggers the engine start up and the engine stop, and determines nominal stroke $H_{nenn}$, which is necessary for the fuel injection and which is transformed from the instantaneous operating data of the internal combustion engine into an electrical control signal applied to control output 301 of control unit 30. Each stroke of valve member 14 which is triggered via actuator 20 with the aid of a control signal causes a fuel injection ES. With the aid of a counter 31 present in control unit 30, injections ES (or the number of strokes of valve member 14) which take place during each active phase of the engine are counted in that counter 31 is started every time the engine starts up and stopped when the engine stops. Appropriate regeneration factor RF is read out from a memory 32, which contains the table according to FIG. 3, as part of the counter content and is supplied to a multiplier 33.

At each engine stop, active temperature change aTW and passive temperature change pTW are detected and assigned in classifiers 34 and 35 to one of the classes (class 1, class 2, class 3) as a function of their temperature value. For this purpose, temperature $T_s$ is measured as aTW at the point in time of the engine stop using a temperature measuring element 61, for example, and maximum temperature $T_{max}$ is detected as pTW using a maximum detector 62 during post-heating time β, which is predefined by a delay element 63, after the engine stop. In each class, consecutive aTWs and pTWs are counted up with the aid of counters 36 through 41 and the counter content, which represents number n of aTWs and pTWs accrued in the individual classes, is supplied to one of multipliers 42 through 47. Moreover, the number of all aTWs and pTWs accrued in all classes are added up in a summator 40 and the sum of all temperature changes TW accrued so far is supplied to a memory 50 which contains the table according to FIG. 4. According to the sum of the TWs, aging factor AF is read out from memory 50 and supplied to multiplier 33.

The stroke losses per active temperature change or per passive temperature change, which are ascertained empirically per class, are each stored in a memory 51 through 56, and memories 51 through 56 are connected to multipliers 42 through 47. Operation time BZ which has incurred for valve 10 is supplied to a multiplier 48 to which a memory 57 is also connected in which the empirically ascertained stroke loss per predefined value of the operation time is stored. In each multiplier 42 through 44, equation (1) is implemented for one of the classes and in each multiplier 45 through 47 equation (2) is implemented for one of the classes, while equation (3) is computed in multiplier 48. All multiplication results are added in summator 58, and the addition result is supplied to multiplier 33. Predicted stroke loss HV is determined in multiplier 33 according to equation (5).

Stroke loss HV is added in an addition element 59 to nominal stroke $H_{nenn}$ for valve member 14, which is ascertained by control unit 30, and effective stroke H* which results therefrom is converted in a transformation element 60 into a control signal SG which is applied to control output 301 of control unit 30 and reaches control input 201 of actuator 20 in valve 10. The stroke loss, which has occurred at valve member 14 due to age, is thus compensated for with the aid of transformed control signal SG, which is enlarged compared to a control signal based on the nominal stroke ascertained by the engine control unit based on the operating data of the internal combustion engine, and valve member 14 carries out a stroke corresponding to stroke $H_{nenn}$ which is predefined by control unit 30.

What is claimed is:

1. A method for controlling a valve which injects fuel into a combustion chamber of an internal combustion engine, the valve having (i) a valve member which closes a valve opening and (ii) an electric actuator which drives the valve member to carry out strokes for releasing the valve opening, the method comprising:
    applying electrical control signals to the actuator for triggering valve member strokes of a defined stroke size;
    predicting, with the aid of a stroke loss model, a reduction of the stroke size as a stroke loss, wherein temperature and temperature changes at the valve as well as the number of strokes carried out by the valve member are continuously incorporated into the stroke loss model;
    correcting, by using the predicted stroke loss, the control signals to compensate for the reduction of the stroke size; and
    empirically ascertaining parameters of the stroke loss model at the valve which is separated from the internal combustion engine.

2. The method as recited in claim 1, wherein the incorporation of temperature changes is carried out separately for active and passive phases of the internal combustion engine, the active phase being initiated when the engine starts up and the passive phase being initiated when the engine stops.

3. The method as recited in claim 2, wherein in the stroke loss model, the number of all active temperature changes and the number of all passive temperature changes and the number of the strokes of the valve member per active phase of the internal combustion engine are taken into consideration, the active temperature changes being defined as a temperature in the valve when the engine stops and the passive temperature changes being defined as the maximum temperature in the valve after a predetermined post-heating time period has elapsed following the engine stop.

4. The method as recited in claim 3, wherein in the stroke loss model, classes having a predefined temperature range and a stroke loss per temperature change, which is empirically ascertained and assigned to each class are provided, and the number of all active and all passive temperature changes is detected in such a way that the detected number is separated according to classes, and the detected number is multiplied by the stroke loss per temperature change assigned to the particular class, and all products obtained through this multiplication are added to one temperature-related stroke loss.

5. The method as recited in claim 4, wherein an operation-time related stroke loss is taken into consideration in the stroke loss model.

6. The method as recited in claim 5, wherein in the stroke loss model, an empirically ascertained stroke loss is provided per predefined value of the operation time and the operation-time related stroke loss is obtained with the aid of multiplication of the instantaneous operation time by the stroke loss per predefined value of the operation time.

7. The method as recited in claim 4, wherein in the stroke loss model, classes having a predefined stroke number range and regeneration factors which are assigned to the classes and which are empirically ascertained for the particular class are provided, and a regeneration factor is retrieved from a particular class to which the number of strokes of the valve member accrued during a particular active phase of the internal combustion engine is to be assigned.

8. The method as recited in claim 4, wherein in the stroke loss model, classes having predefined number ranges for the number of all accrued temperature changes and having aging factors which are assigned to the classes and are empirically determined for the particular class are provided, and an aging factor is retrieved from a particular class to which an instantaneously accrued number of temperature changes is to be assigned.

9. The method as recited in claim 8, wherein the predicted stroke loss is determined as the sum of the temperature-change related stroke loss and the operation-time related stroke loss which is multiplied by the regeneration factor and the aging factor.

10. The method as recited in claim 9, wherein a stroke size of the valve member, having the predicted stroke loss, which is predefined based on the operating data of the internal combustion engine is added to an effective stroke size, and the effective stroke size is transformed into an electrical control signal which triggers a stroke of the valve member corresponding to the effective stroke size.

11. The method as recited in claim 9, wherein the temperature is measured at the valve.

12. The method as recited in claim 9, wherein the temperature at the valve is derived from an estimated temperature model.

13. A control device for controlling a valve which injects fuel into a combustion chamber of an internal combustion engine, the valve having (i) a valve member which closes a valve opening, (ii) an electric actuator which drives the valve member to carry out strokes for releasing the valve opening, and (iii) a control input for electrical control signals, the control device comprising:

an engine control unit which is connected to the control input and which generates the control signals as a function of operating data of the internal combustion engine, wherein the engine control unit has a stroke loss model which predicts a reduction of the stroke size as a stroke loss, wherein the engine control unit is configured to continuously incorporate temperature and temperature changes at the valve as well as the number of strokes carried out by the valve member into the stroke loss model, and the engine control unit corrects, by using the predicted stroke loss, the control signals to compensate for the reduction of the stroke size, and wherein parameters of the stroke loss model are empirically ascertained at the valve which is separated from the internal combustion engine.

\* \* \* \* \*